Oct. 31, 1939.  T. SEYBERT  2,178,269
BATTER MIXER SCRAPING MECHANISM
Filed Jan. 23, 1939    4 Sheets-Sheet 1

Witnesses:
C. E. Wessels
Janet McKay

Inventor:
Theodore Seybert,
By Joshua R. H. Potts
his Attorney.

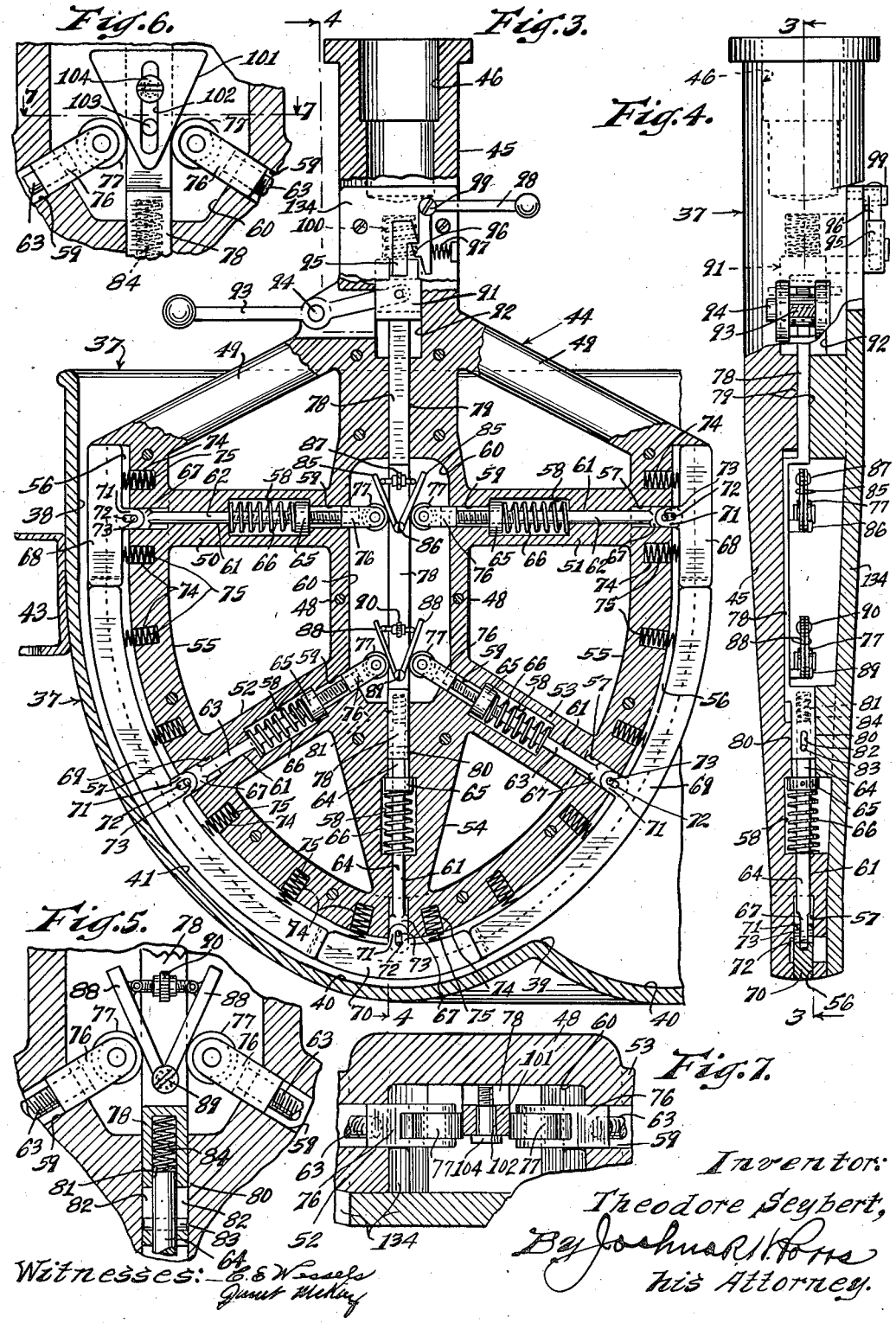

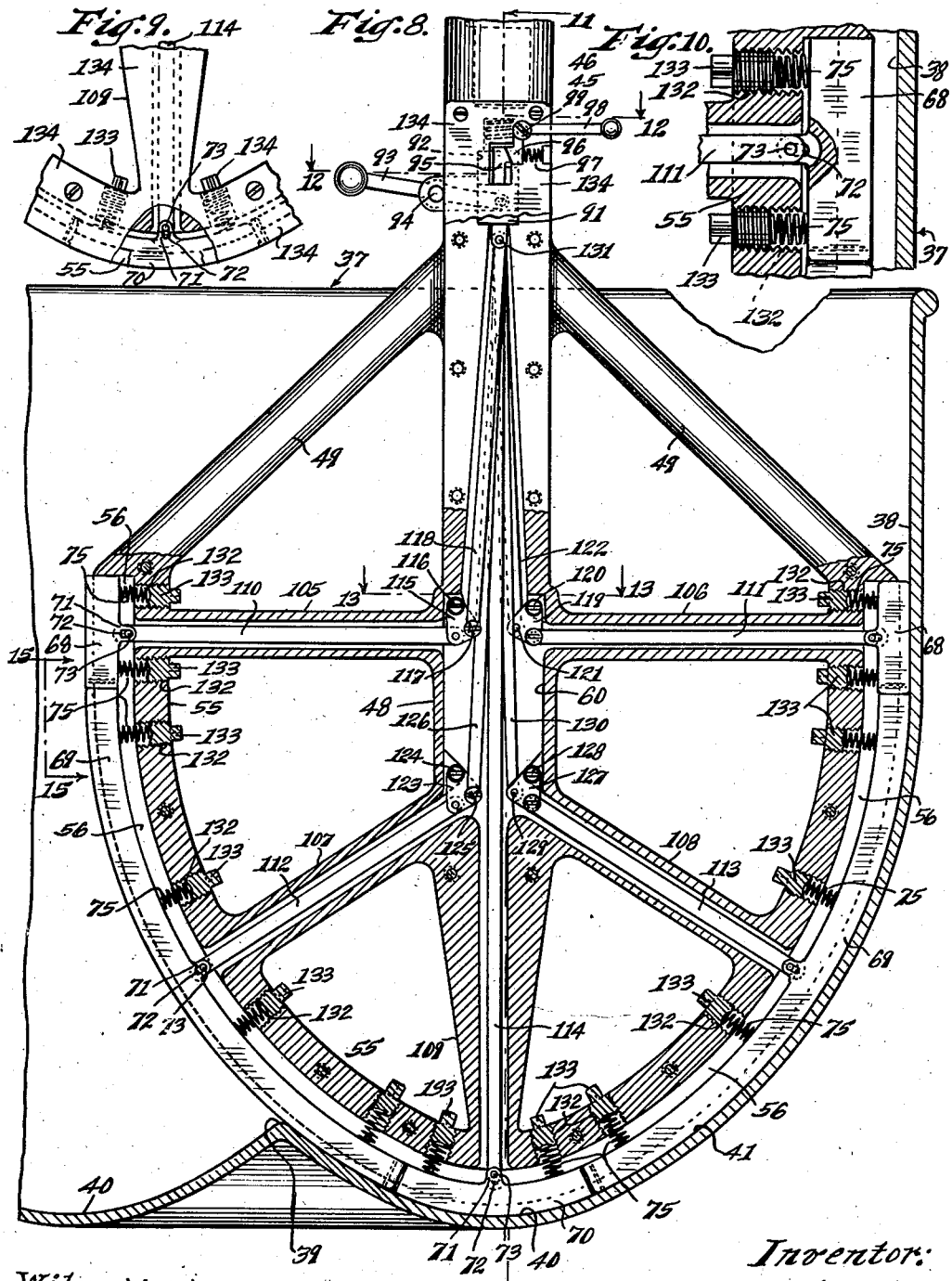

Oct. 31, 1939.                    T. SEYBERT                    2,178,269
                      BATTER MIXER SCRAPING MECHANISM
                 Filed Jan. 23, 1939          4 Sheets-Sheet 4
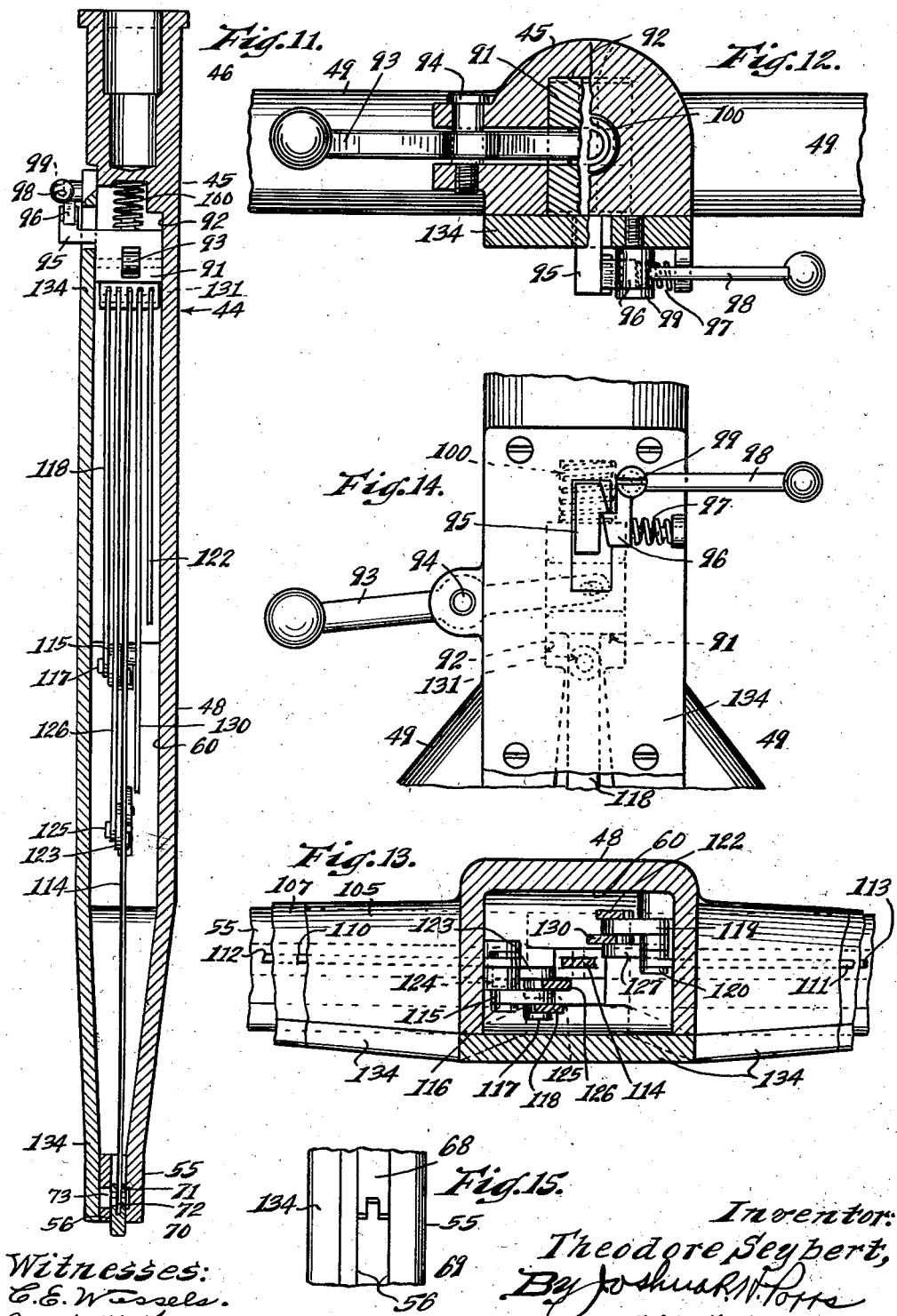

Patented Oct. 31, 1939

2,178,269

UNITED STATES PATENT OFFICE 2,178,269

BATTER MIXER SCRAPING MECHANISM

Theodore Seybert, Chicago, Ill.

Application January 23, 1939, Serial No. 252,332

21 Claims. (Cl. 259—102)

This invention relates to improvements in a scraping mechanism for a batter mixer, and the principal object of the invention resides in the provision of mechanism including scraping members which are adapted to be extended or protruded beyond the normal edge of the mixer or beater and brought into direct contact with the inner surface of the batter or dough containing receptacle for periodically scraping and removing the accumulated batter which adheres to the inner surface of the container.

The mechanism is especially adapted for use in conjunction with a mechanical batter mixer incorporating a rapidly rotating stirrer or beater and in devices of this character, there has heretofore been provided a slight clearance between the peripheral edge of the mixer or beater and the inner surface of the bowl or receptacle. This has resulted in the formation of a thin layer of batter, for example, equal in thickness to this clearance, upon the inner surface of the container. This layer of batter, as in mixing a batter for cake, pastry or the like, has been manually removed at stated intervals, by stopping the machine and scraping the inner surface with a knife or similar utensil. If this is not done, there is an uneven mixture and the batter is lumpy. An important object of the present invention, is the provision of improved mechanism whereby this scraping operation may be performed in a thorough and efficient manner without the necessity of stopping the machine. Thus not only is a more uniform and superior batter produced, but the loss of time and inconvenience of the manual scraping are overcome.

An additional object is the incorporation of the scraping mechanism directly within the beater frame, whereby the structure is not only strong and durable, but may be readily cleaned.

Other objects will appear hereinafter.

The invention consists in the combinations and arrangements of parts hereinafter described and claimed.

The invention will be best understood by reference to the accompanying drawings forming a part of this specification and in which:

Fig. 3 is a vertical sectional view to more clearly illustrate the inner construction of the preferred form of the invention, taken substantially on the line 3—3 of Fig. 4;

Fig. 4 is a transverse sectional view, partly in elevation, taken substantially on the line 4—4 of Fig. 3;

Fig. 5 is a detail view of the lower operating mechanism shown in Fig. 3 for engagement with the angular radial rods;

Fig. 6 is a view similar to Fig. 5 showing a modified form of construction for operating the lower angular push rods;

Fig. 7 is a horizontal sectional view, taken substantially on the line 7—7 of Fig. 6;

Fig. 8 is a view, similar to Fig. 3, but showing a modified form of construction and also showing the scraping elements in extended position;

Fig. 9 is a detail view with the cover plate applied, but partly broken away, showing the lowermost shoe or scraping member in retracted position;

Fig. 10 is a vertical sectional view showing the scraping member mounted upon the right horizontal radial rod as shown in Fig. 8, with the scraping member shown in retracted position;

Fig. 11 is a vertical sectional view taken substantially on the line 11—11 of Fig. 8;

Fig. 12 is an enlarged detail view, partly in section, showing the operating mechanism, and taken substantially on the line 12—12 of Fig. 8;

Fig. 13 is an enlarged detail view, partly in section, taken substantially on the line 13—13 of Fig. 8;

Fig. 14 is an enlarged detail elevational view of the operating mechanism and showing the positions assumed by the parts when the scraping members are in retracted position; and Fig. 15 is a detail view, taken substantially on the line 15—15 of Fig. 8, showing the preferred dovetail arrangement of the meeting ends of contiguous shoe members.

Figure 1:
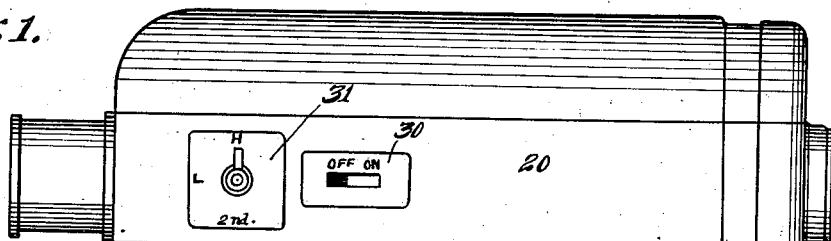
Fig. 1 is a side elevational view of the complete structure, with the batter containing bowl or receptacle shown in section, to illustrate a side view of the improved mixing member wherein the scraping shoes are in retracted position and concealed within the frame of the mixer.
Figure 2:
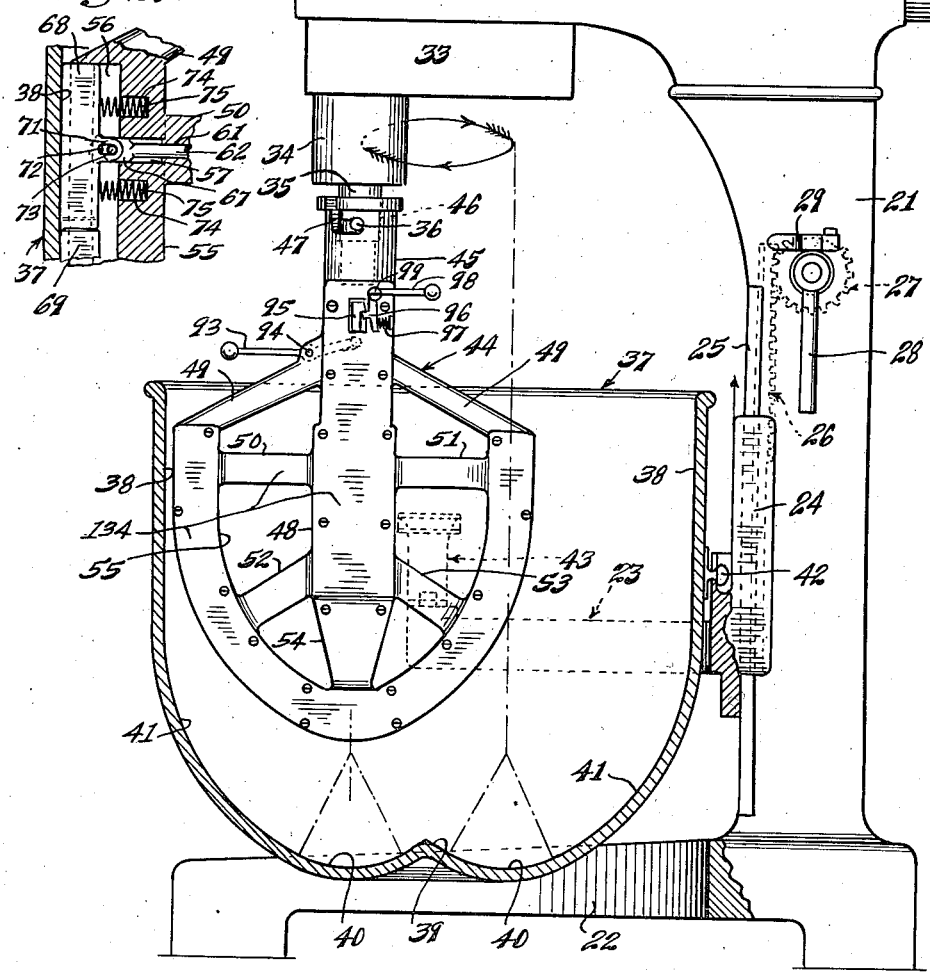
Fig. 2 is a vertical sectional view showing the interior construction adjacent the shoe or scraping member mounted upon the left horizontal radial rod as shown in Fig. 1, for example, with the scraping shoe in extended position and in contact with the bowl inner surface.

The invention resides principally in an improved mixer or beater member, and a complete operative device is shown in Fig. 1 to illustrate the complete combination. Referring to this figure of a preferred embodiment, an electric motor housing 20 is mounted upon a stand 21 supported by base 22. A bowl supporting bracket 23 is adapted to embrace a portion of the batter containing bowl or receptacle and is mounted upon a bracket support 24 arranged for vertical movement on rails 25. The bracket support 24 is provided with an upwardly extended rack gear 26, the teeth of which mesh with the teeth on pinion 27 which is rigidly connected to elevating handle 28, and which is arranged to be held in any desired position by locking pawl 29.

The motor is provided with a switch 30 and also with the customary speed control 31 for low, high, and intermediate speeds, and current is supplied through wires 32.

A transmission housing 33 has enclosed therein a central shaft and suitable gearing for driving the offset shaft hub 34 at a high rate of speed. This gearing is also constructed and arranged to cause the shaft hub 34 to revolve around the main enclosed drive shaft while being rotated at a relatively high speed. The shaft hub 34 has mounted therein a mixer drive shaft 35 provided with laterally extending pins 36.

The mixing bowl or receptacle 37, in the present illustrative embodiment, has an upper cylindrical portion 38, a central elevation 39 at the bottom, an annular curved portion 40 on one radius and a side annular curved portion 41 on a second radius. Mounted upon the side of bowl 37 is a supporting knob 42 adapted to be inserted in an opening in bracket support 24 and mounted on the exterior of bowl 37 are a pair of handles 43, as shown in Fig. 3, the under sides of which are socketed to fit over pins on the bracket arms 23.

The mixer 44 is provided with an upper central shank 45 bored to provide a socket 46 for receiving shaft 35 and having a bayonet slot 47 for engagement by pins 36. The main central body portion 48 of the mixer has upper lateral extending arms 49, rigidly connecting the central body portion with the operating portion. Centrally disposed are a pair of horizontal radial hollow or tubular arms 50 and 51 and a pair of angularly disposed radial arms 52 and 53, as well as a vertical connecting arm 54 shown as constituting the lower portion of the body portion 48. These arms terminate in an outward connecting rim 55.

Referring to Figs. 3 and 4, there is provided in the rim 55 a peripheral recess 56 within which the scraping shoes hereinafter described are adapted to be moved into a retracted position during normal operation and extended position during the scraping operation. Adjacent the outer extremity of each of the lateral five arms mentioned, the rim 55 has transverse pockets 57 to accommodate the operative connections between the shoes or scraping members and connected parts as presently described. Each of these arms has an enlarged spring recess 58 and inner recesses 59. The body portion 48 is provided with a central operating chamber 60 and the operating arms are also provided with outer bores or recesses 61 for receiving the push rods. Thus the upper push rods 62 are mounted in the horizontal arms 50 and 51, the angular push rods 63 are mounted in angular arms 52 and 53, and the vertical push rod 64 is mounted in the vertical connecting arm 54. Each of these push rods carries a collar 65 and a compression spring 66 is interposed between this collar and the outer shoulder formed by the recess 58, thus tending to urge the push rods inwardly or into retracted position, and the outward end of each push rod has a flattened portion 67.

As clearly shown in Fig. 3, each of the horizontal push rods 62 is connected to a scraper shoe 68. These scraper shoes may be composed of any suitable material such as rubber, bronze or similar metal, as long as the material is softer than the material of which the bowl is constructed, so as to avoid an abrading action thereon. When employing hard rubber, for example, suitable supporting frames are provided. Similarly, each angular push rod 63 is provided with a scraper shoe 69, and the vertical push rod 64 is provided with a scraper shoe 70. The reason for employing a plurality of scraper shoes is that the contour of the inner surface of the mixing bowl as illustrated is not uniform. It will be understood that the design and shape of the peripheral rim as well as of the scraping members is dictated by the shape and contour of the inner surface of the bowl. In the present embodiment, the outer edges of the shoes 68 are straight, the edges of shoes 69 are curved on the same radius, and the edge of shoe 70 is curved on a different radius.

Each of the scraping members is provided with a pair of spaced centrally disposed ears 71 having slots 72 and adapted to straddle the flattened extension 67 of the associated push rod. In each such connection a pin 73 extends through the flattened portion and the slots permit of slight radial movement. The peripheral rim 55 is preferably provided with a plurality of pockets 74 within which are inserted extending springs 75 to produce a cushioning effect when the scraping members are in extended position. The inner ends of the push rods have threaded thereon bearing members 76 upon which are mounted rollers 77.

In this particular construction, the operating parts are manipulated by means of a central operating stem 78 slidably mounted in an upper guide portion 79 and a lower guide portion 80. As shown in Fig. 5, the stem 78 has a central bore 81 at its lower end and also slots 82. Pin 83 is inserted through the vertical push rod 64 and is adapted to ride in the slots 82, the push rod being urged outwardly by spring 84. This arrangement is for the purpose of equalizing the thrust exerted on the push rods upon depression of stem 78.

Referring again to Figs. 3 and 4, stem 78 has mounted thereon a pair of upper cam arms 85, pivoted at 86 and connected by a turnbuckle 87 for adjusting the angular inclination to vary the extent of thrust upon the associated push rods 62. Stem 78 also carries a pair of lower cam arms 88 pivoted at 89 and connected by turnbuckle 90 for a similar purpose in connection with push rods 63. The upper end of stem 78 is secured to an operating block 91 which is movable in recess 92 and pivotally connected to the inner end of operating lever 93 which is pivoted at 94 to the frame. To maintain the stem 78 normally in its upper position whereby the push rods are retracted, the upper extremity is provided with a hook member 95 adapted to be engaged by detent 96 which is forced inwardly by spring 97. Detent 96 has an outwardly extending releasing arm 98 and the detent member is pivoted at 99. Mounted adjacent these parts and adapted to bear against block 91 is a compression spring 100 of sufficient strength to overcome combined resistance exerted by springs 66. Fig. 6 shows a modified form of cam element for operating the lateral push rods and comprises a triangular cam member 101 having slot 102 for receiving guide pin 103 to permit of vertical adjustment and secured in place by screw 104 threaded in stem 78.

In Figs. 8 to 14, inclusive, a modified form of construction is shown. This structure comprises a left horizontal tubular or hollow arm 105, a right horizontal tubular arm 106, a left angular tubular arm 107, a right angular tubular arm 108 and a vertical tubular arm 109. Push rod 110 is mounted for longitudinal movement in arm 105, push rod 111 is similarly mounted in arm 106, push rod 112 in arm 107, push rod 113 in arm 108 and the center push rod 114, which in reality is an elongated link, is mounted in arm 109. The inner end of push rod 110 is pivotally connected to a bell crank plate 115 which is pivoted at 116, and at 117 there is a pivotal connection to operating link 118. Similarly, bell crank plate 119 is pivoted at 120 and is pivotally connected at 121 to operating link 122. Also bell crank plate 123, pivoted at 124, is connected at 125 to operating link 126, and bell crank plate 127, pivoted at 128 is connected at 129 to operating link 130. In this construction and arrangement the upper ends of the links 114, 118, 122, 126 and 130 are all pivotally connected at 131 to operating block 91. The remainder of the operating and releasing mechanism is the same as the structure of Fig. 3. However in the arrangement shown in Fig. 8, the extending springs 75 are mounted in threaded sockets 132 and are engaged by adjusting plugs 133 whereby the tension of springs 75 may be regulated. As shown in Fig. 15, the adjacent end portions of the scraping members are preferably dovetailed to avoid spreading or separating when the parts are in extended position. The assembly is completed by plate 134 which is attached to the main body portion preferably by a plurality of counter-sunk screws.

In operation, the desired amount of batter, for example, is placed in the bowl 37. The bowl is then elevated to operating position by means of handle 28. The motor is started by switch 30 and speed is regulated through the speed control 31. The mixing frame not only rotates very rapidly on its own shaft 35, but shaft 35 describes a circular travel. When it is desired to scrape the batter which has adhered to the sides and bottom of the bowl, the speed is preferably reduced to low. Thereupon releasing arm 98 is raised, allowing stem 78 to be forced downwardly by spring 100 and causing the scraping members to be brought into contact with the inner surface of the bowl. It is not necessary to stop the machine for this scraping purpose. This operation is allowed to continue for a sufficient length of time to cleanse the inner surface of the bowl after which the scraping members are retracted by depressing lever 93 and the stem 78 is held in restricted position by detent 96. The speed is then increased and normal operation continues. It is only necessary to perform the scraping operation at certain intervals to obtain a smooth mixture of uniform consistency. The operation with respect to the structure shown in Fig. 8 is the same inasmuch as the depressing of the lever 93, shown in this figure, causes all the link connections to be drawn upwardly and the scraping members retracted. The cushion springs 75 cause the shoes or scraping members to yield upon encountering any irregularity in the surface of the bowl and also serve to maintain constant contact even though the bowl may not be accurately placed with respect to the mixing member.

It will be apparent that the shape of the outer frame member and the associated scraping members may be modified to operate in conjunction with receptacles of different size and shapes, and also that the invention may be utilized with a flat bottom container as well as with a batter or dough mixer of the horizontal type.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent, is:

1. A device of the character described comprising a mixer having a peripheral edge portion, scraping members mounted in said edge portion and restrained on opposite sides, mechanism for extending and retracting said scraping members, said mechanism comprising a plurality of push rods connected to said scraping members, a single operating means engaging said push rods for projecting or retracting the same, and resilient cushioning means associated with said scraping members.

2. A device of the character described comprising a mixing member having a peripheral edge portion and provided with a plurality of laterally extending arms, scraping members mounted end to end adjacent said edge portion, longitudinally movable push rods mounted in said arms and operatively connected to said scraping members individually, and operating mechanism engaging said push rods to spread the push rods for projecting the scraping members.

3. A device of the character described comprising a mixing member having a curved peripheral edge portion and provided with a plurality of laterally extending arms, scraping members mounted adjacent said edge portion, confined laterally and conforming to said curved edge portion, normally retracted longitudinally movable push rods mounted in said arms and operatively connected to said scraping members, operating mechanism engaging said push rods for spreading the same to project the scraping members, and resilient cushioning means associated with said scraping members.

4. A device of the character described comprising a mixing member having a peripheral edge portion and provided with a plurality of laterally extending arms, scraping members mounted adjacent said edge portion, longitudinally movable push rods mounted in said arms and operatively connected to said scraping members, actuating mechanism operatively associated with said push rods, said actuating mechanism comprising a central operating stem and means for longitudinally shifting said push rods.

5. A device of the character described comprising a mixing member having a peripheral edge portion and provided with a plurality of laterally extending arms, scraping members mounted adjacent said edge portion, longitudinally movable push rods mounted in said arms and operatively connected to said scraping members, actuating mechanism operatively associated with said push rods, said actuating mechanism comprising a central operating stem, an operating member for longitudinally shifting said push rods, and resilient cushioning means associated with said scraping members.

6. A device of the character described comprising a mixing member having a peripheral edge portion and provided with a plurality of laterally extending arms, scraping members mounted adjacent said edge portion, longitudinally movable push rods mounted in said arms and operatively connected to said scraping members, operating mechanism engaging said push rods, and actuating mechanism operatively associated with said operating mechanism, said operating mechanism comprising a plurality of link members operatively connected to said push rods.

7. A device of the character described comprising a mixing member having a peripheral edge portion and provided with a plurality of laterally extending arms, scraping members mounted adjacent said edge portion, longitudinally movable push rods mounted in said arms and operatively connected to said scraping members, operating mechanism engaging said push rods, actuating mechanism operatively associated with said operating mechanism, said operating mechanism comprising a plurality of link members operatively connected to said push rods, and resilient cushioning means associated with said scraping members.

8. A device of the character described comprising a mixing member having a peripheral edge portion and provided with a plurality of laterally extending arms, scraping members mounted adjacent said edge portion, longitudinally movable push rods mounted in said arms and operatively connected to said scraping members, actuating mechanism operatively associated with said push rods, said actuating mechanism comprising a central operating stem, a cam member for longitudinally shifting said push rods, and a control lever for operating said stem.

9. A device of the character described comprising a mixing member having a peripheral edge portion and provided with a plurality of laterally extending arms, scraping members mounted adjacent said edge portion, longitudinally movable push rods mounted in said arms and operatively connected to said scraping members, actuating mechanism operatively associated with said push rods, said actuating mechanism comprising a central operating stem, a cam member for longitudinally shifting said push rods, resilient cushioning means associated with said scraping members, and a control lever for operating said stem.

10. A device of the character described comprising a mixing member having a peripheral edge portion and provided with a plurality of laterally extending arms, scraping members mounted adjacent said edge portion, longitudinally movable push rods mounted in said arms and operatively connected to said scraping members, actuating mechanism operatively associated with said push rods, said actuating mechanism comprising a plurality of link members operatively connected to said push rods, and a control lever for operating said link members.

11. A device of the character described comprising a mixing member having a peripheral edge portion and provided with a plurality of laterally extending arms, scraping members mounted adjacent said edge portion, longitudinally movable push rods mounted in said arms and operatively connected to said scraping members, operating mechanism engaging said push rods, actuating mechanism operatively associated with said operating mechanism, said operating mechanism comprising a plurality of link members operatively connected to said push rods, resilient cushioning means associated with said scraping members, and a control lever for operating said link members.

12. A device of the character described comprising a mixing member having a curved peripheral edge portion with a groove and provided with a plurality of laterally extending arms, scraping members mounted adjacent said edge portion in said groove and following the curvature thereof, longitudinally movable push rods mounted in said arms and operatively connected to said scraping members, operating mechanism engaging said push rods, and spring means tending to urge said push rods into retracted position.

13. A device of the character described comprising a mixing member having a peripheral edge portion and provided with a plurality of laterally extending arms, scraping members mounted adjacent said edge portion, longitudinally movable push rods mounted in said arms and operatively connected to said scraping members, actuating mechanism operatively associated with said push rods, said actuating mechanism comprising a central operating stem, a cam member for longitudinally shifting said push rods, and spring means tending to urge said push rods into retracted position.

14. A device of the character described comprising a mixing member having a peripheral edge portion and provided with a plurality of laterally extending arms, scraping members mounted adjacent said edge portion, longitudinally movable push rods mounted in said arms and operatively connected to said scraping members, actuating mechanism operatively associated with said push rods, said actuating mechanism comprising a plurality of members operatively connected to said push rods, and spring means tending to urge said push rods into retracted position.

15. A device of the character described comprising a mixing member having a peripheral edge portion and provided with a plurality of laterally extending arms, scraping members mounted adjacent said edge portion, longitudinally movable push rods mounted in said arms and operatively connected to said scraping members, actuating mechanism operatively associated with said push rods, said actuating mechanism comprising a central operating stem, a cam member or longitudinally shifting said push rods, a control lever for operating said stem, and spring means tending to urge said push rods into retracted position.

16. A device of the character described comprising a mixing member having a peripheral edge portion and provided with a plurality of laterally extending arms, scraping members mounted adjacent said edge portion, longitudinally movable push rods mounted in said arms and operatively connected to said scraping members, actuating mechanism operatively associated with said push rods, said actuating mechanism comprising a plurality of link members operatively connected to said push rods, a control lever for operating said link members, and spring means tending to urge said push rods into retracted position.

17. A batter mixer scraping mechanism including drive means, a mixer including a shank detachably connected to the drive means, said mixer having a curved rim, shoes disposed end to end mounted in said rim and held on opposite sides, means to normally retract the shoes and means on the scraper for projecting the shoes outwardly of the rim against the retracting means.

18. A batter mixer scraping mechanism including drive means, said mixer having a curved rim of substantially paraboloidal form, shoes mounted in said rim and held on opposite sides, resilient means normally retracting the shoes, means for cushioning said retraction and tending to normally exert outward thrust on the shoes, and a single operating member for projecting the shoes against said resilient means.

19. A batter mixer scraping mechanism including drive means, said mixer having a curved rim of substantially paraboloidal form, a plurality of shoes disposed endwise around and mounted in said rim, resilient means normally retracting the shoes, means for cushioning said retraction and tending to normally exert outward thrust on the shoes, an operating member having means engaging the shoes to simultaneously project the same and means to hold said operating member in a set position to hold the shoes retracted or projected.

20. Batter mixer scraping mechanism, including drive means having a hub, a drive shaft, a mixer including a shank having means to connect to the shaft, a body portion having lateral arms and a rim, scraper shoes movable in said rim, cushioning means to normally retract the shoes within the periphery of the rim, means to cushion the shoes in extended positions and means in the shank to simultaneously extend the shoes beyond the peripheral edge of the mixer or release the same for retraction within the rim.

21. A device of the character described comprising a mixing member having a peripheral edge portion and provided with a plurality of laterally extending arms, scraping members mounted adjacent said edge portion, longitudinally movable push rods mounted in said arms and operatively connected to said scraping members, operating mechanism engaging said push rods, actuating mechanism operatively associated with said push rods, said actuating mechanism comprising a central operating stem, an operating member for longitudinally shifting said push rods, and resilient cushioning means associated with said scraping members.

THEODORE SEYBERT.